(12) United States Patent
Müller et al.

(10) Patent No.: US 7,124,401 B2
(45) Date of Patent: Oct. 17, 2006

(54) TESTING VERSIONS OF APPLICATIONS

(75) Inventors: Horst Müller, Schriesheim (DE); Jan Olsen, Malsch (DE); Thomas Lendroth, Leimen-Gauangelloch (DE); Marc Webster, Heidelberg (DE); Nils Kirstaedter, Berlin (DE); Jens Fichtner, Leipzig (DE); Michael Schaffrath, Leipzig (DE)

(73) Assignee: SAP Aktiengesellschaft, Walldorf (DE)

( * ) Notice: Subject to any disclaimer, the term of this patent is extended or adjusted under 35 U.S.C. 154(b) by 288 days.

(21) Appl. No.: 10/234,983

(22) Filed: Sep. 3, 2002

(65) Prior Publication Data

US 2004/0044993 A1    Mar. 4, 2004

(51) Int. Cl.
G06F 9/44    (2006.01)
(52) U.S. Cl. ............................ 717/124; 717/122
(58) Field of Classification Search ................ 717/124, 717/115, 121, 122, 174, 175
See application file for complete search history.

(56) References Cited

U.S. PATENT DOCUMENTS

| | | | |
|---|---|---|---|
| 5,495,571 A | 2/1996 | Corrie, Jr. et al. | |
| 5,659,547 A * | 8/1997 | Scarr et al. | ............ 714/4 |
| 5,758,156 A | 5/1998 | Kano | |
| 5,761,408 A | 6/1998 | Kolawa et al. | |
| 5,781,720 A | 7/1998 | Parker et al. | |
| 5,827,070 A * | 10/1998 | Kershaw et al. | ........ 434/322 |
| 5,905,856 A | 5/1999 | Ottensooser | |
| 6,002,868 A | 12/1999 | Jenkins et al. | |
| 6,002,869 A | 12/1999 | Hinckley | |
| 6,182,245 B1 * | 1/2001 | Akin et al. | ........... 714/38 |
| 6,249,882 B1 | 6/2001 | Testardi | |
| 6,279,124 B1 | 8/2001 | Brouwer et al. | |
| 6,697,967 B1 | 2/2004 | Robertson | |
| 6,772,083 B1 | 8/2004 | Müller et al. | |
| 6,883,166 B1 | 4/2005 | Thompson | |
| 6,983,451 B1 | 1/2006 | Colaiuta | |
| 2003/0126586 A1 | 7/2003 | Sluiman et al. | |
| 2004/0003325 A1 | 1/2004 | Muller et al. | |
| 2004/0010735 A1 | 1/2004 | Paternostro et al. | |
| 2004/0010776 A1 | 1/2004 | Shah | |
| 2004/0041827 A1 | 3/2004 | Bischof et al. | |
| 2004/0044992 A1 | 3/2004 | Muller et al. | |
| 2004/0044993 A1 | 3/2004 | Muller et al. | |
| 2005/0044544 A1 | 2/2005 | Slivka et al. | |

OTHER PUBLICATIONS

Johnson et al., "Using XML As a Flexible, Portable Test Script Language", *IEEE*, 2003, pp. 187-192.
Xu et al. "Using an Object-Relational Knowledge Base for Software Testing", *IEEE*, 1999, pp. 36-41.

* cited by examiner

*Primary Examiner*—Wei Zhen
*Assistant Examiner*—Anna Deng
(74) *Attorney, Agent, or Firm*—Fish & Richardson P.C.

(57) ABSTRACT

Methods and apparatus, including computer program products, for use in testing a computer program application, including an application having multiple versions. Information identifying a target system is obtained. Application information identifying the actual version of the application as installed on the target system is obtained. A test script is selected from multiple test script versions based on the actual version of the application. The selected test script is used to test the application as installed on the target system.

24 Claims, 8 Drawing Sheets

| Element | Description | Value | Default | Type | Reference |
|---|---|---|---|---|---|
| CUSTOMER_DATA_IN | Customer data | | | | |
| CUSTNAME | | I_CUST_NAME | | Char | S_CUSTNAME |
| FORM | | I_CUST_FORM | | Char | S_FORM |
| CUSTTYPE | | I_CUST_TYPE | | Char | |
| LANG_ISO | | | 'DE' | Char | |

| Alias | Test data container |
|---|---|
| TD1 | Customer_data_1 |
| TD2 | Supplier_data_1 |
| TD3 | Test_suite_parameters |

710

| Variant name | Description | PARAM_01 | PARAM_02 | PARAM_03 |
|---|---|---|---|---|
| Default | | | | "Hello" |
| VAR1 | | | | |
| VAR2 | | | | |
| VAR3 | | | | |
| VAR4 | | PARAM_03(TD1, VAR4) | PARAM_04(TD1, VAR4) | PARAM_05(TD1, VAR4) |

720

TESTING VERSIONS OF APPLICATIONS

BACKGROUND

The present invention relates to data processing by digital computer, and more particularly to testing versions of computer programs.

Applications are used by computer systems, for example, to process (e.g., sort, filter, store) data. To ensure proper processing of the data, the applications are generally tested. In one approach to testing, known inputs are supplied to the application during execution to establish what the predicted proper outputs would be. Using these predicted outputs, another instance of the application running on a possibly different platform and running at any location may be tested by applying the same inputs to the other application and comparing the processed outputs to the predicted outputs. The testing is done by a process that contains testing instructions that deliver a large number of tests to the application and process the results to determine whether features of the application are working properly.

When features of an application are changed or enhanced to produce an updated application or a newer application version, the testing process must be updated, too. In addition, because older versions of the application may continue to be used, the original test process must be maintained and used even though a new test process has been generated.

SUMMARY OF THE INVENTION

In general, in one aspect, this invention provides methods and apparatus, including computer program products, implementing and using techniques for testing a computer program application. Information identifying a target system is obtained. Application information identifying the actual version of the application as installed on the target system is obtained. A test script is selected from multiple test script versions based on the actual version of the application and the selected test script is used to test the application as installed on the target system.

Advantageous implementations can include one or more of the following features. The application information can be obtained from meta-data installed on the target system. The meta-data can be generated by a build process building the application. The meta-data can be installed on the target system by an install process installing the application on the target system. The application information can be obtained from the application on the target system. Multiple test script versions can have a common associated parameter interface defining import and export parameters available for each of the multiple test script versions. Each of the multiple test script versions can have associated with it information specifying with which application versions the test script version is suitable for use. A set of input parameter values for a function call in the test script can be obtained, it can be determined whether the set of input parameter values provides a complete set of input parameters for the function call, and the function call can be executed with the set of input parameter values. The function call can be executed only if the set of input parameter values does provide a complete set of input parameters, and otherwise the test script is terminated with an error. The test script can have an associated parameter interface defining input parameters available for use in the test script, and parameter values can be accessed according to the parameter interface to obtain the set of input parameter values for the function call in the test script.

A set of input parameter values can be obtained for a function call in the test script, it can be determined whether the set of input parameter values provides a complete set of input parameters for the function call, default parameter values can be obtained for input parameters for the function call if the set of input parameter values does not provide a complete set of input parameters, and the function call can be executed with the set of input parameter values and the default parameter values. The function call can be executed only if the set of input parameter values and the default parameter values provide a complete set of input parameters and the test script can otherwise be terminated with an error otherwise. The test script can have an associated parameter interface defining input parameters available for use in the test script, and the parameter interface can be used to obtain import and export parameters for the test script.

In general, in another aspect, this invention provides methods and apparatus, including computer program products, implementing and using techniques for handling parameters in a test script. A test script for testing a function of a computer program is executed. The test script includes a command invoking the function and arguments, and the command arguments in the test script include a set of test input parameters for the function. The required input parameters for the function are determined. An error is detected if there is a mismatch between the required input parameters and the test input parameters.

Advantageous implementations can include one or more of the following features. The required input parameters for the function can be determined by obtaining meta-data describing the function as it exists in a particular installation of the computer program. The test script can be terminated and the error can be reported if the test input parameters include more than the required input parameters. The test script can be terminated and the error can be reported if the test input parameters include more than the required input parameters and a strict mode of operation is in effect. The test script can be terminated and the error can be reported if the test input parameters do not include all the required input parameters and no default values have been established for the parameters missing from the test input parameters.

In general, in another aspect, this invention provides methods and apparatus, including computer program products, implementing and using techniques for handling parameters in a test script. A set of test records defining variant parameter values for test parameters is received. A first and a second test script for testing a function of a computer program is received. The test scripts have distinct first and second sets of import parameters, respectively. The first and second test scripts are executed against first and second versions of the computer program, respectively, using the same set of test records to provide import parameter values.

In general, in another aspect, this invention provides methods and apparatus, including computer program products, implementing and using techniques for testing a computer program. A test configuration is received. The test configuration has an associated test script and one or more associated data containers. Each data container defines a set of parameters and one or more sets of variants, each set of variants specify a value for each of the parameters in the set of parameters, and each data container is reusable with multiple test configurations. The test script has a set of test parameters and the test configuration in addition has a set of test parameter variants. Each of the test parameter variants is a set of values for respective test parameters in the set of test parameters. The test parameter variants include one or more references for obtaining data values from each one or more of the associated data containers. The test script is executed to test a computer program. The test script is executed for each of the test parameter variants in the set of test parameter variants.

The invention can be implemented to realize one or more of the following advantages. By using command interfaces to access test data for application testing, repetitive listing of the test data and parameters is reduced in a test script and test scripts condense into manageable sizes. Also, command interfaces may be reused in the test script to improve the efficiency of creating and editing test scripts. Over testing periods, trends may emerge which repetitively use similar command interfaces that may be accessed from a library and not recreated for testing future application functions.

Moreover, command interfaces do not have to be revised when a new version of a test script is written. Superfluous parameters in the command interfaces may be disregarded or omitted from the feature call, and additional parameters that need to be passed to the feature under test may be assigned default values. Where a test script does not use command interfaces, the same principles can be used to adjust feature calls, so that the original version of the test script can be used to test a new version of the feature. In other words, a new version of a feature does not necessarily require a new version of the test script used to test the feature.

In addition, using a table, database, or resource to determine which version of a test script should be used to test a particular version of an application allows for test scripts and test cases to be developed and organized in a coherent fashion from a central location.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 4A and FIG. 4B show a user interface display of a test script.

Like reference numbers and designations in the various drawings indicate like elements.

DETAILED DESCRIPTION

Figure 1:
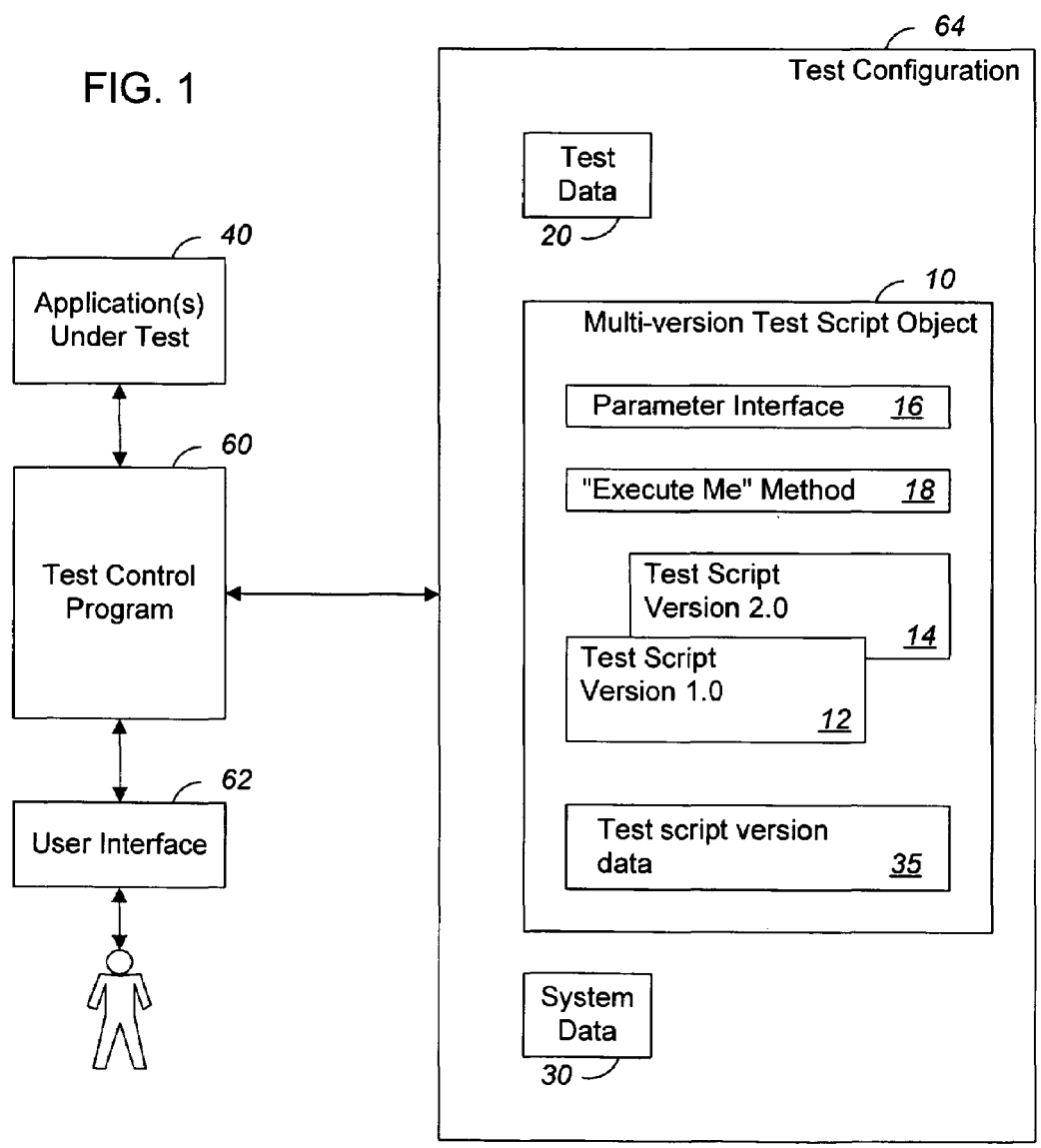
FIG. 1 is a block diagram illustrating an implementation and use of a multi-version test script.

FIG. 1 illustrates one implementation of the invention based on object technology. A test control program 60 can be used to test one or more computer program applications under test 40. The applications being tested can be installed on one or more computers, generally distinct from the computer on which the test control program 60 is running. The test control program can be run by a user interacting with the program through a user interface 62.

The one or more applications being tested can be referred to as a solution. To test particular functionality of a solution, a test configuration 64 is created, generally by a test developer using a test development workbench. The test configuration can encapsulate data and scripts to test one or more particular program functions. The test configuration can include test data 20, system data 30, and a multi-version test script object 10. The test data 20 and system data 30 are generic—that is, they are not specific for any particularly functionality—and so it will generally be more convenient to implement the test configuration 64 as a persistent object containing links to this data, rather than the data itself. The script object 10, on the other hand, is specific for one or more particular solution functions. It is advantageous from the point of view of reuse for the script object 10 to be specific for one particular function. Nevertheless, it is convenient to implement test data 20, system data 30, and script object 10 as respective persistent objects that can be reused as appropriate. A particular implementation of this will be described later in reference to FIG. 6.

The script object 10 is designed to be used to test particular functionality in multiple versions of an application, as will be described below.

The script object 10 has a parameter interface 16 and, as required, multiple versions 12, 14 of a test script. The parameter interface 16 defines the parameters that can be imported to, and exported from, the test script. The script object 10 has a public method 18 that is called to execute a test script. The script object 10 also has test script version data 35 to identify the appropriate test script version for any particular version of the application being tested. This can provided in a table or other data structure, or the information can be associated with each test script as an attribute that identifies the application versions for which the test script can be used. This information will be updated as new test script and application versions are created. The parameter interface 16 is the same for all test script versions. A test script will in general also have variables, command interfaces, and other script language constructs that are not global to all test script versions.

The test control program 60 can obtain meta-data describing the solution to be tested as it is installed on one or more particular computers, to determine version and other information about the application or applications and their particular installation. The meta-data will generally be provided by application build and installation processes and be stored in mass file storage local to the computer on which each application is installed. However, this information can also be stored in some central repository.

With these resources, a user can create a test plan made up of one or more test configurations 64, each having a script object 10 to test particular functionality of a solution as it is installed on one of more particular computers. It is advantageous that the user can do so without having to specify what the version is of each application to be tested, what the version is of its user interface, or what version of the test script should be used. When a particular script object 10 is executed, it will use the proper test script version according to the actual installed application version or versions.

Figure 2:
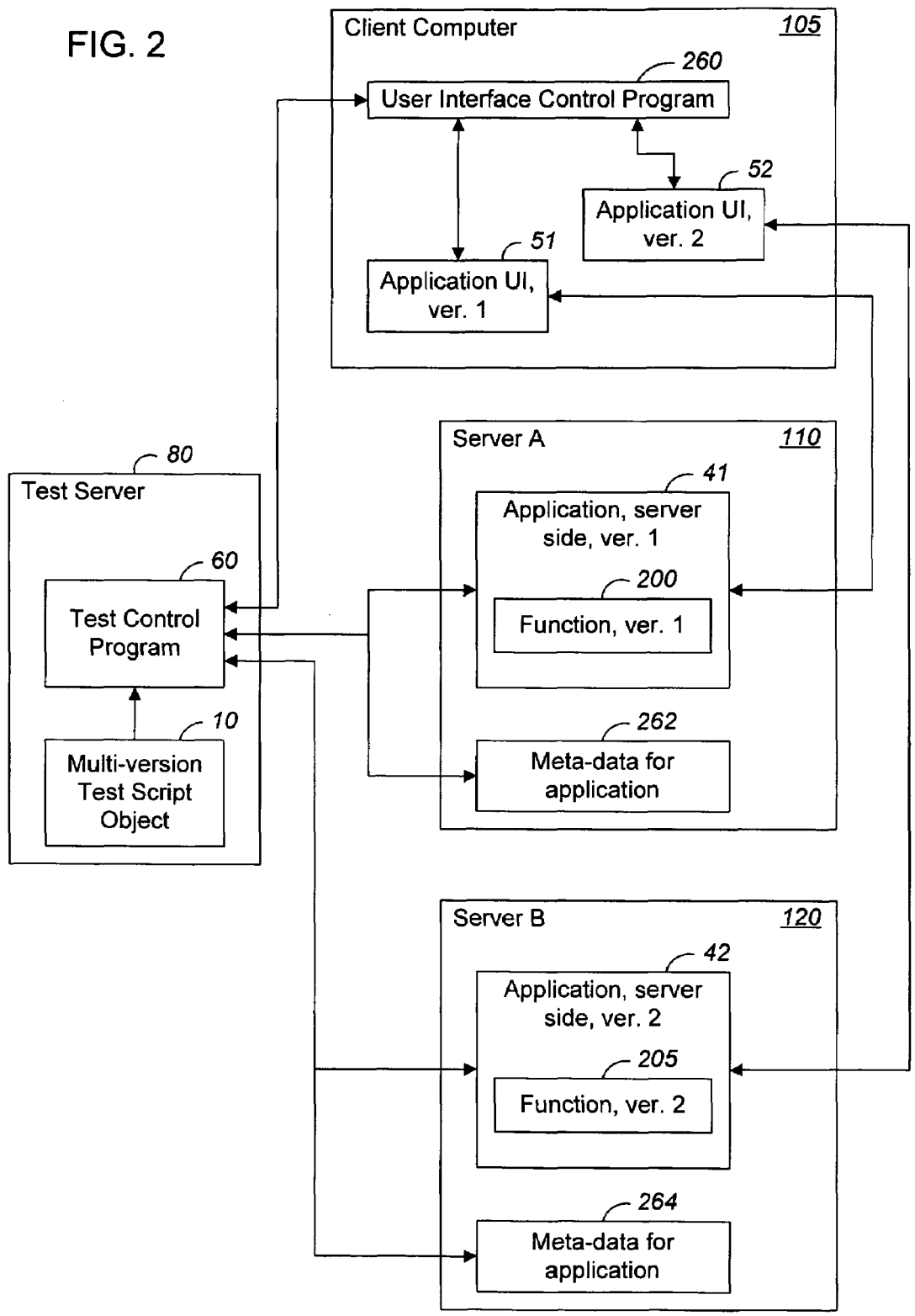
FIG. 2 is a block diagram of a test server, a client computer, and two servers with applications to be tested.

FIG. 2 shows a specific example of an application to be tested, the application having two versions, an old version (version 1) 41 and a new version (version 2) 42, distributed across multiple computers. The functionality of the application can be invoked directly or through a user interface, of which an old version 51 and a new version 52 are shown, these corresponding to old and new versions 41, 42 of the application, respectively. The user interfaces 51, 52 can be, for example, HTML (Hypertext Markup Language) pages generated by the application and displayed by a Web browser running on a client computer 105. For this example, both the old and new versions of the user interface are shown as running on client computer 105.

The test control program 60 can interact with a user interface through a user interface control program 260 to test an application and user interface combination. To test application functions directly, the test control program communicates directly with the application.

In this example, the test control program 60 is running on a test server 80 and is using the test script object 10 to test application functions 200, 205 of the application. The old and new versions 41, 42 of the application reside respectively on a server A 110 and a server B 120. Meta-data 262 is installed on server A, and meta-data 264 is installed on server B, describing the application as it is installed on those servers, respectively.

The script object 10, as illustrated in FIG. 1, has two script versions 12, 14 that correspond to the old and new versions 41, 42 of the application. However, a script object can have as many test script versions as are required to test the extant versions of the corresponding application. Moreover, one test script version can be used to test multiple versions of a solution. In this particular example, test script version 1.0 12 is used to test the old version 41, while test script version 2.0 14 is used to test the new version 42.

A user, e.g., a test manager, can request the test control program 60 to initiate a test by identifying the computer or computers on which the solution to be tested is installed and a script object 10. The installation information can be provided to the script object 10 as a call parameter or, more conveniently, in system data 30 (FIG. 1), where it can be used by other script objects. Similarly, the test control program can obtain, e.g., from application meta-data 262, 264, version information about the application or applications to be tested and provide it to the script object 10, e.g., by storing the information in system data 30 (FIG. 1); or the script object 10 can obtain this information itself. Having the application version information, the script object uses its test version data to select the appropriate test script to be executed.

In general, a test script will be executed multiple times by a test control program 60. The test script is parameterized for imported and exported data through the parameter interface of the script object, and each time the test script is executed, a different set of parameter variants will be provided from a collection of test records.

To manage the large volume of input data due to the multiple function calls, the command interface associated with each function call in the respective script versions 12, 14 can be used repetitively to access different input data. A command interface is a data structure that is used to store the names, types, and values of parameters that are to be passed to an entity being tested (which can be a function module, an object method, a transaction field, or a screen or other GUI element). A command interface can also be used to assign specific initial or default values to parameters. Command interfaces are preferably stored in an intermediate format language with validation capabilities, such as XML. In essence, command interfaces allow the description of the interfaces of the entities that are being tested, as well as the content with which the entities are to be invoked, to be separated from test scripts. Command interfaces thus offer condensed and more logical views of test scripts, and allow values or groups of values to be re-used in multiple invocations and even in multiple test scripts.

By programming access to input test data using a command interface data structure, one can express the respective script versions 12, 14 in a compact form with little repetition of test data and input parameters. (Command interfaces are described in commonly-owned, copending U.S. patent application Ser. No. 10/186,387, filed Jun. 28, 2002, the disclosure of which is incorporated here by reference.)

Figure 3:
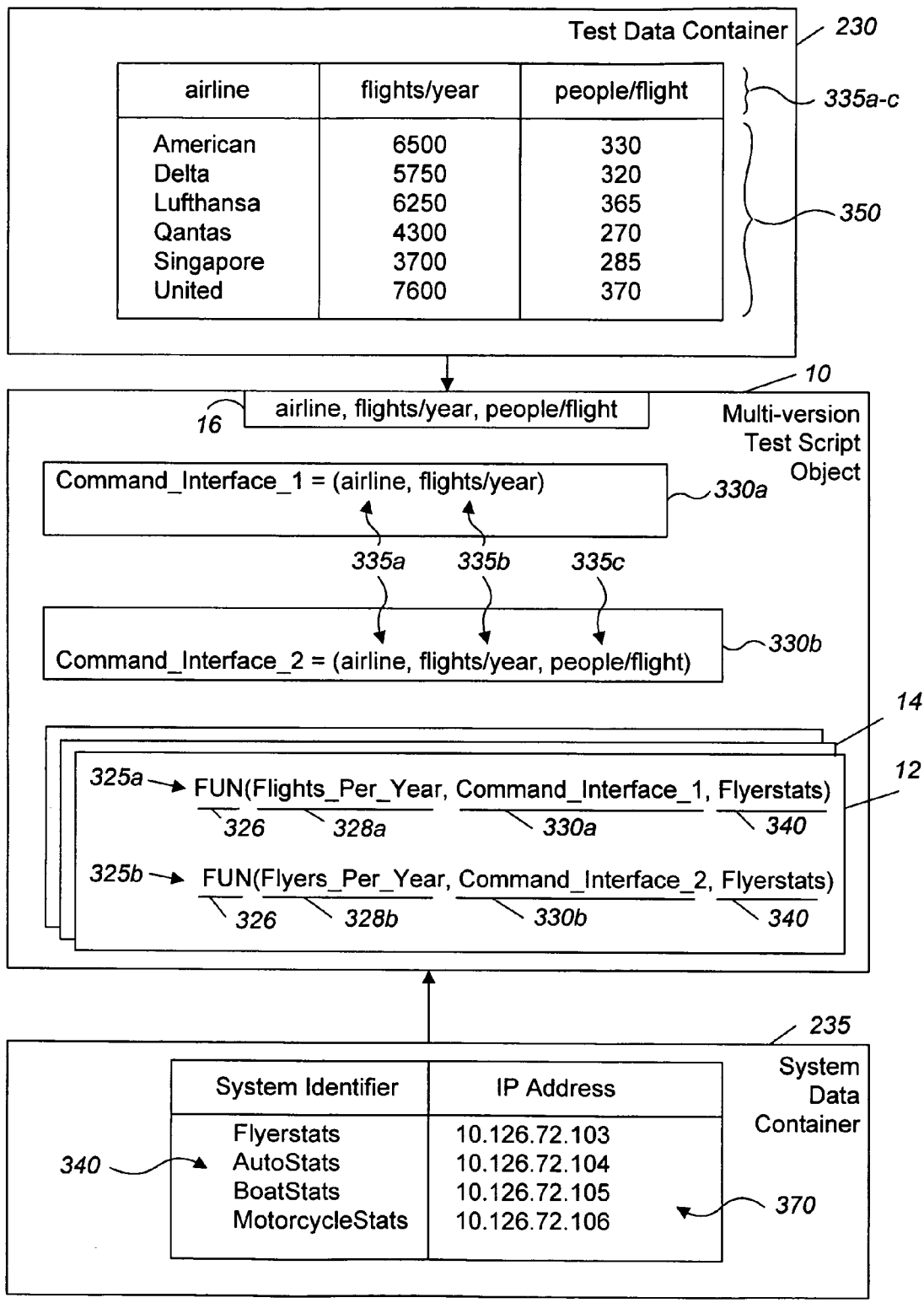
FIG. 3 is a block diagram of a test data container, a system data container, and a test script.

FIG. 3 shows a specific example of a script object 10 that contains multiple test scripts, including versions 12 and 14, for testing versions 1 and 2 of a computer program application. In this particular example, script version 12 has been selected, and two of its commands 325a, 325b are shown, which each invoke an application function. Each of the two function calls 325a, 325b is a driver command "FUN" 326, which invokes respective application functions 328a, 328b. (Similarly, a driver command for a user interface would invoke user interface actions.) The command arguments also include (i) respective command interfaces 330a, 330b, and (ii) a computer system identifier 340 that is resolved according to computer system information 370 in a system data container 235. As shown, for example, the first command 325a executes a function 328a named "Flights_Per_Year" and the second command 325b executes a function 328b named "Flyers_Per_Year".

The computer system identifier 340 is convenient in the situation where the functions of a solution are implemented in multiple applications—which will generally interact with each other—on multiple computer systems; in that situation, the particular application desired can be specified by identifying the computer system on which it is installed, which need only be done once for all script objects that are used to perform a particular set of tests.

In the example of FIG. 3, each of the command interfaces 330a, 330b use import parameters defined in the parameter interface 16 to obtain variant values for parameters 335a–c from a test data container 230. When a test script is executed, the command interfaces 330a, 330b are used to retrieve input data, stored in the test data container 230, through the parameter interface 16, and to transfer the data to the respective functions 328a, 328b. In the example of FIG. 3, the parameters "airline" 335a, "flights/year" 335b, and "people/flight" 335c have six variants 350 in the test data container 230. Thus, the test script version 1.0 12 will be performed six times, each time with a different variant set of input parameters.

Figure 4A:
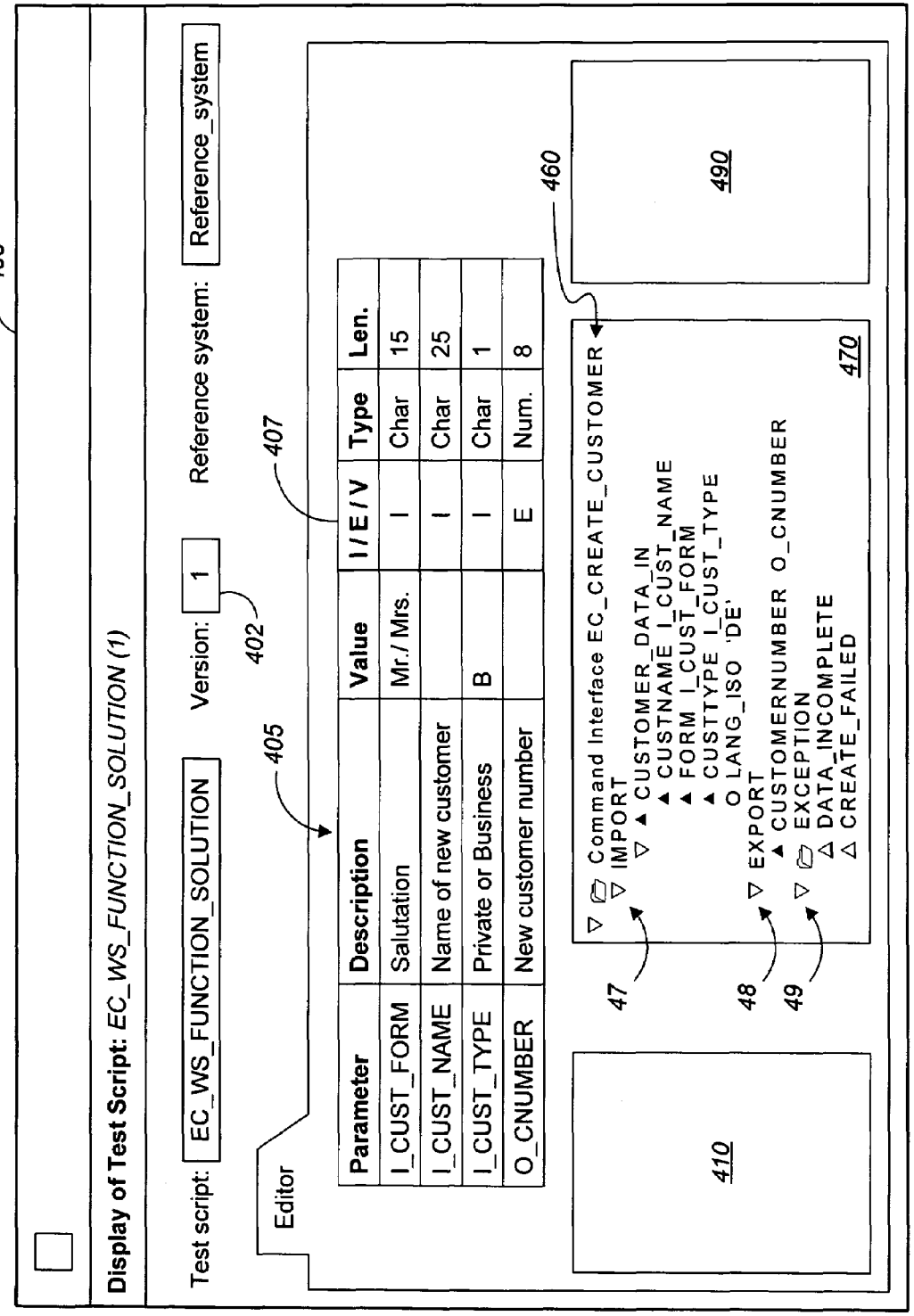

FIG. 4A is a schematic diagram of a graphical user interface (GUI) 400 of a test script editor program. The display shows that a user has selected to edit a script object called EC_WS_FUNCTION_SOLUTION, and in particular, test script version 1 of that script object FIG. 4A is a schematic diagram of a graphical user interface (GUI) 400 of a test script editor program. The display shows that a user has selected to edit a script object called EC_WS_FUNCTION_SOLUTION, and in particular, test script version 1 of that script object. A reference system has also been selected, for the editor to use as a source of meta-data describing the parameters and functions referred to in the test script and script object 402. A reference system has also been selected, for the editor to use as a source of meta-data describing the parameters and functions referred to in the test script and script object.

The current test script—in the example of FIG. 4A, version 1—is shown in pane 410. Typically, a test script will include commands to perform an application function or to perform actions on an application user interface or both, conditional commands, and calls reading application data to determine if functions operated properly.

The GUI 400 also has a pane 470 in which it displays elements of the command interface "EC_CREATE_CUSTOMER_1" 460. These include import parameters 47, export parameters 48, and parameters 49 for exceptions thrown by a command. As shown in FIG. 4B (pane 490), each of the import or export parameters can be assigned a value of any defined data type, e.g., string, a variable, a constant, a Boolean, or other simple type, or a composite or structured type. Icons can be used to indicate the status of the parameter—for example, whether or not a value has been assigned to the parameter, and if so, whether or not the value is fixed.

The parameter interface display area 405 is provided for the user to see and edit the parameters in the parameter interface. In particular, the user can use I/E/V field 407 to define test script parameters as import parameters ("I"), export parameters ("E"), or local variables ("V").

A user can select a different test script version for editing by entering a different value in the version field 402. Thus, newer and older versions of the test script can be loaded for viewing and editing. As newer versions of the test script are developed for testing, more parameters can be added to import and export parameters the parameter interface to expand the data that is passed to, and received from, the test script versions and hence to or from application features under test.

This architecture of a script object that has a parameter interface and supports multiple test script versions has a number of advantages for the person developing tests for new versions of solutions. A script object can be expanded by adding new script versions, even with the addition of parameters to the parameter interface, as long as the parameter interface remains valid for prior uses. Test script versions can be copied and edited within a script object. Copied commands can be used even if the application has changed, because default values can be used if a complete set of parameter values for an application function is not present, assuming default values have been provided.

Figure 5A:
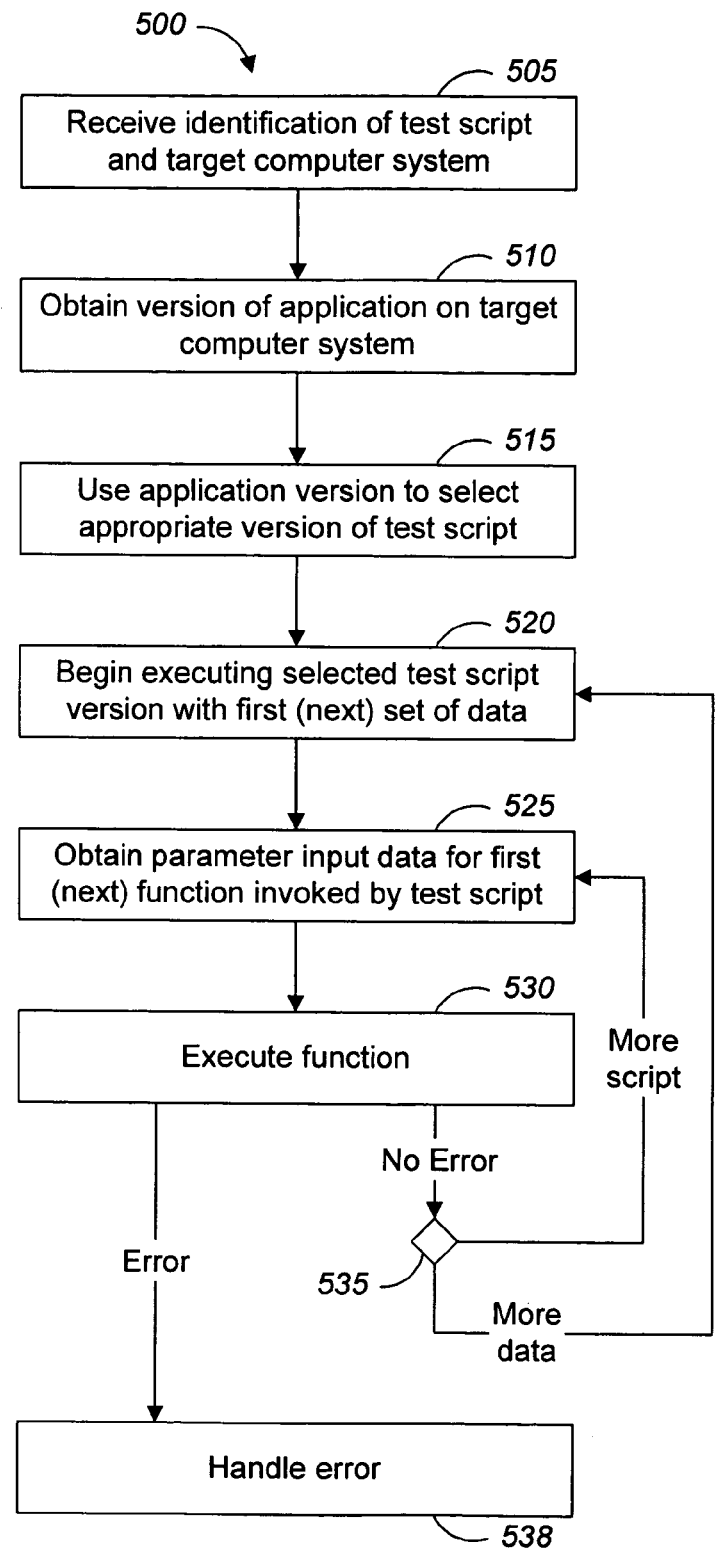
FIG. 5A and FIG. 5B are a flowchart of a method for using a test script to test an application function.

FIG. 5A shows a process 500 for using a test script to test application functions of a particular installed version of an application. The process begins by receiving, for example, from a test manager, an identification of a test script and an identification of a target system, that is, of a computer system to be tested (step 505). The process then obtains the version of the application installed on the target system (step 510). This can be done by obtaining meta-data about the installed application from the target system. The application version is used to select an appropriate test script version to test the application installed on the target system (step 515). This can be done by using the application version to look up the appropriate test script version in a test script version table, or to find a script version having an associated property that indicates it is suitable for the application version. The test script versions can be organized in a multi-version test script object, described above, or in any other convenient form of repository, such as a database.

Next, the process begins executing the selected test script version with a first set of parameter data (step 520). The test script can include one or more commands, each of which will cause an application function to be executed. Before executing an application function, the process obtains the parameter input data for the function (step 525). This can be done using a parameter interface of a multi-version test script object, for example, to obtain input (import) parameters to pass to the function.

The process then executes, or attempts to execute, the function (step 530). If there is an error or the function cannot be executed, the process handles the error (step 538). Otherwise, if there is more of the test script to be executed, the process continues, handling possible further function commands in the test script (step 535 to step 525); or, if the test script is done but there is more data for testing, executing the test script again with that data (step 535 to step 520).

Figure 5B:
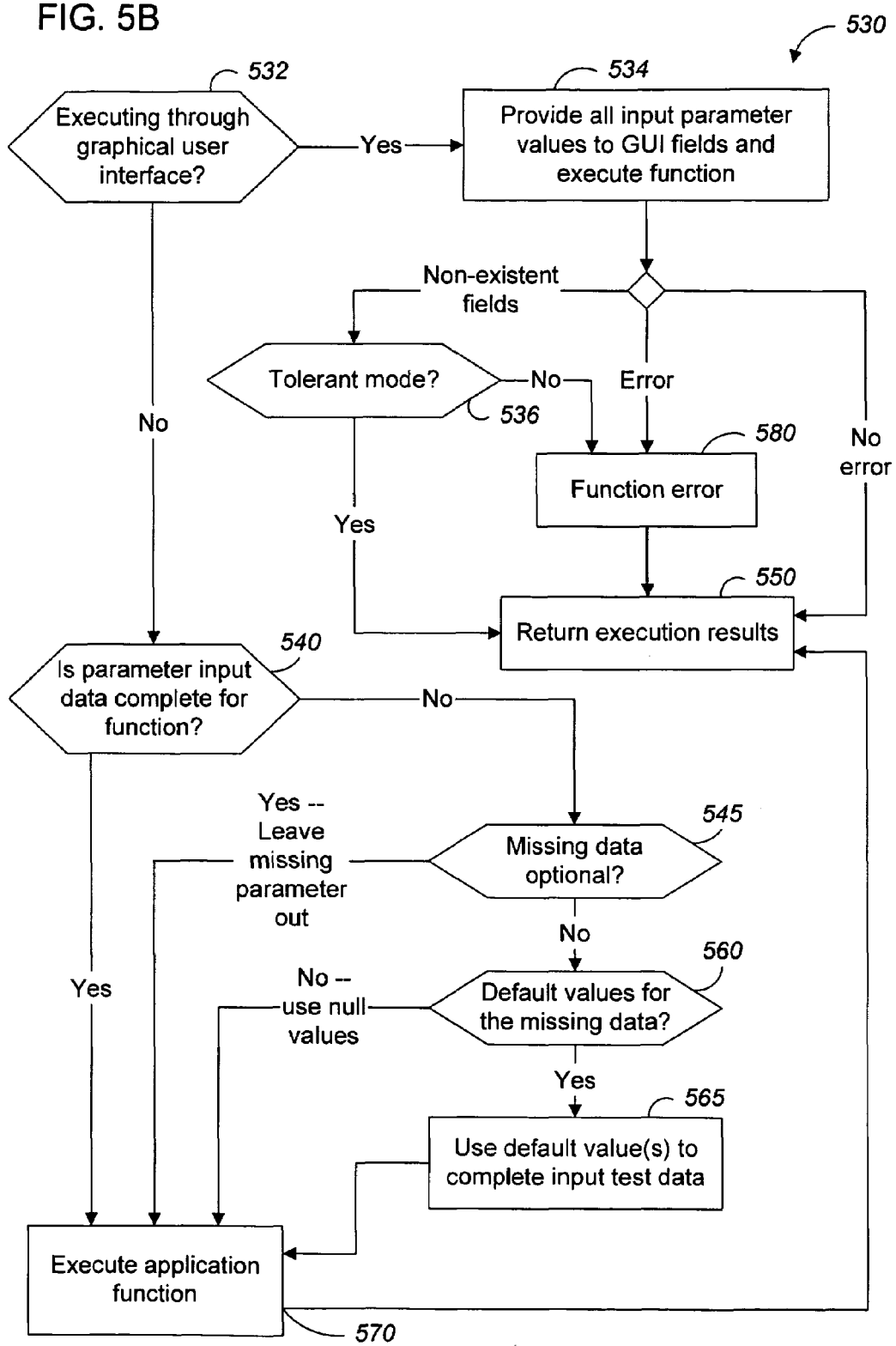

FIG. 5B illustrates how various conditions of too much or too little parameter data are handled in one implementation of the step of attempting to execute an application function (step 530). If a graphical user interface function is to be executed ("yes" branch from step 532), e.g., through a user interface control program 260 (FIG. 2), all of the input parameter values are provided to their associated input fields and the function is executed (step 534). If the set of available values is insufficient—some required fields are not filled in—the function will report an error. If values are provided for fields that do not exist in the graphical user interface, the condition is ignored if an optional tolerant mode of operation is in effect ("yes" branch from step 536), and an error is recognized otherwise (step 580). In any event, the results of executing the function are returned (step 550).

If an application function is to be executed directly ("no" branch from step 532), the availability of input parameters in excess of what is specified for the function is ignored. If all the input data expected by the function is available ("yes" branch from step 540), the function is executed (step 570). What data is expected by a function can be determined by obtaining meta-data from the target system about the installed application, for example After the function is executed, the results of the execution are returned, for example to a test control program (step 550) and processing of the test script continues (see FIG. 5A).

To the extent there data is missing, if the data is optional, the corresponding parameter is left out of the call to the function (step 545 to step 570). To the extent data is missing, if the data is not optional ("no" branch from step 545), the process determines whether there are default values for the missing input data (step 560). Default values can be obtained from meta-data associated with the function, for example. If default values exist, the default values are used (step 565). To the extent no default values exist, null or empty values are used, according to the data type. The application function is then executed (step 570) and the results of the execution are returned (step 550), possibly with an indication of an error arising from the use of null or empty values, and processing of the test script continues (see FIG. 5A). In one alternative implementation, the absence of non-optional data values is treated as an error; in another alternative, the absence of default values for missing non-optional data values is treated as an error.

Figures 6, 7:
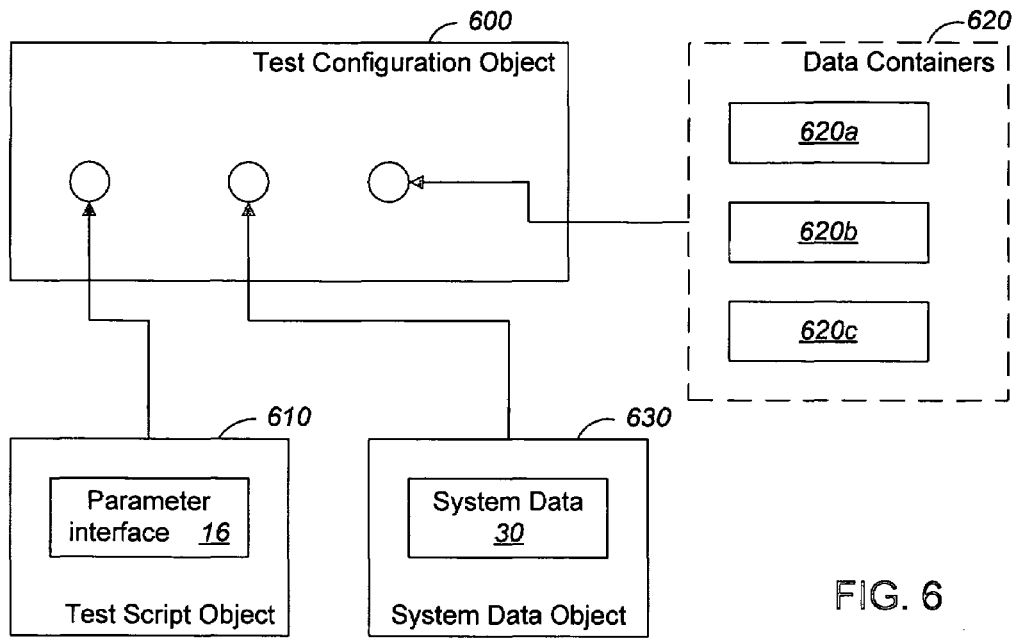
FIG. 6 illustrates a test configuration implemented as a test configuration object.
FIG. 7 is a schematic diagram of elements of a user interface used to edit a test configuration.

FIG. 6 illustrates a test configuration 64 (FIG. 1) implemented as a test configuration object 600. The test configuration object 600 has a link to a test script object 610, which can be a multi-version test script object 10 (illustrated in FIG. 1) or a simple, single version test script. The test configuration object also has links to one or more test data containers 620 (e.g., as illustrated, to three data container objects 620a, 620b, 620c) that contain test data 20 (FIG. 1) and a link to a system data container object 630 that contains system data 30 (FIG. 1).

From the test script object 610, the test configuration object 600 receives information specifying the input parameters required by the test script object. In the case of a multi-version test script object, this would be the set union of the input parameters required by all the individual test scripts in the object, which is specified by a parameter interface 16, described earlier.

The correspondence between test data values and the parameter interface of the test script object is defined in the test configuration object. As a result, the test configuration object is self-sufficient and no further data is needed to perform a test. This is done by defining parameter variants in the test configuration. These will be referred to as test parameter variants, to distinguish them from the variants defined in the data containers.

FIG. 7 is a schematic diagram of a portion of a user interface for an editor used to edit a test configuration. This will be used to illustrate the relationships defined in a test configuration between data containers and test parameters.

Test data container list 710 is a list of test data container objects and their corresponding aliases. The aliases can be freely chosen by the user, and the user can find test data containers (objects or other resources containing test data) by browsing, by use of a wizard, or by other conventional techniques. The variant list 720 allows the user to list the variants to be used in tests defined by this test configuration. Each test parameter variant, other than the default variant, can be given an optional name and description. The parameters then are named in the column headings (PARAM_01, . . . ) and the parameter values are found in the rows defining the variants. The parameter values can be constants and can be of any type, e.g., the text constant "Hello" is the default value for test parameter PARAM_03. Advantageously, the test parameter values can be drawn from test data containers. In this implementation, the test data containers are presented with the same tabular format as the test configuration, where parameters have names and variants and a value is defined for a name-variant pair. Thus, as shown in the bottom row of the variant list 720, a value from a test data container is specified by naming the test data container, a parameter, and a variant (both as named in the test data container). It is advantageous to use aliases for the test data container names, so that containers can be replaced without requiring other changes in the test configuration. In particular, the value of the variant named VAR4 of test parameter PARAM_01, is PARAM_03 (TD1, VAR4). This refers to test data container TD1—an alias for a test data container called Customer_data_1—and the value of variant VAR4 of PARAM_03 as defined in that data container.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a data processing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Apparatus of the invention can be implemented as a programmed computer or as special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The invention can be implemented in a computing system that includes a back-end component, e.g., as a data server, or includes a middleware component, e.g., an application server, or includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

Test scripts and script objects can be created in a variety of computer languages. Representing test scripts and script objects in a platform independent language, e.g., Extensible Markup Language (XML), allows one to provide test scripts that can be used on different types of computer platforms.

The invention has been described in terms of particular embodiments. Other embodiments are within the scope of the following claims. For example, the steps of the invention can be performed in a different order and still achieve desirable results. Multiple test script versions can edited and invoked as a unit without using object-oriented programming technology; for example, the elements of a script object can be organized in a structured database or a file system, and the operations described as being performed by the script object can be performed by a test control program, for example.

What is claimed is:

1. A computer-implemented method for testing a computer program application, the method comprising:

obtaining in a test control program running on a test computer information identifying a target system, the target system being distinct from the test computer;

obtaining in the test control program application information identifying the actual version of the application as installed on the target system;

selecting by the test control program a test script from multiple test script versions based on the actual version of the application;

using the selected test script by the test control program to test the application as installed on the target system;

obtaining a set of input parameter values for a function call in the test script, the function call invoking a function of the application;

determining whether the set of input parameter values provides a complete set of input parameters for the function call;

obtaining default parameter values for input parameters for the function call if the set of input parameter values does not provide a complete set of input parameters; and executing the function call only if the set of input parameter values and the default parameter values do provide a complete set of input parameters and terminating the test script with an error otherwise.

2. The method of claim 1, further comprising:
obtaining the application information from meta data installed on the target system.

3. The method of claim 2, wherein the meta data was generated by a build process building the application.

4. The method of claim 3, wherein the meta data was installed on the target system by an install process installing the application on the target system.

5. The method of claim 1, further comprising;
obtaining the application information from the application on the target system.

6. The method of claim 1, wherein the multiple test script versions have a common associated parameter interface defining import and export parameters available for each of the multiple test script versions.

7. The method of claim 1, wherein each of the multiple test script versions has associated with it information specifying with which application versions the test script version is suitable for use.

8. The method of claim 1, further comprising:
obtaining a set of input parameter values for a function call in the test script, the function call invoking a function of the application;
determining whether the set of input parameter values provides a complete set of input parameters for the function call; and
executing the function call with the set of input parameter values.

9. The method of claim 1, further comprising:
executing the function call only if the set of input parameter values does provide a complete set of input parameters and terminating the test script with an error otherwise.

10. The method of claim 1, wherein the test script has an associated parameter interface defining input parameters available for use in the test script, the method further comprising:
accessing parameter values according to the parameter interface to obtain the set of input parameter values for the function call in the test script.

11. The method of claim 1, wherein the test script has an associated parameter interface defining input parameters available for use in the test script, the method further comprising:
accessing parameter values according to the parameter interface to obtain the set of input parameter values for the function call in the test script.

12. The method of claim 1, wherein the test script has an associated parameter interface defining input parameters available for use in the test script, the method further comprising:
using the parameter interface to obtain import and export parameters for the test script.

13. A computer program product, tangibly embodied in a machine readable storage device, for storing instructions for testing a feature of a target version of a software application, the computer program product being operable to cause a test computer to:
obtain information identifying a target system, the target system being distinct from the test computer;
obtain application information identifying the actual version of the application as installed on the target system;
select a test script from multiple test script versions based on the actual version of the application;
use the selected test script to test the application as installed on the target system;
obtaining a set of input parameter values for a function call in the test script, the function call invoking a function of the application;
determining whether the set of input parameter values provides a complete set of input parameters for the function call;
obtaining default parameter values for input parameters for the function call if the set of input parameter values does not provide a complete set of input parameters; and
executing the function call only if the set of input parameter values and the default parameter values do provide a complete set of input parameters and terminate the test script with an error otherwise.

14. The computer program product of claim 13, further comprising instructions to:
obtain the application information from meta data installed on the target system.

15. The computer program product of claim 14, wherein the meta data was generated by a build process building the application.

16. The computer program product of claim 15, wherein the meta data was installed on the target system by an install process installing the application on the target system.

17. The computer program product of claim 13, further comprising instructions to:
obtain the application information from the application on the target system.

18. The computer program product of claim 13, wherein the multiple test script versions have a common associated parameter interface defining import and export parameters available for each of the multiple test script versions.

19. The computer program product of claim 13, wherein each of the multiple test script versions has associated with it information specifying with which application versions the test script version is suitable for use.

20. The computer program product of claim 13, further comprising instructions to:
obtain a set of input parameter values for a function call in the test script, the function call invoking a function of the application;
determine whether the set of input parameter values provides a complete set of input parameters for the function call; and
execute the function call with the set of input parameter values.

21. The computer program product of claim 13, further comprising instructions to:
execute the function call only if the set of input parameter values does provide a complete set of input parameters and terminating the test script with an error otherwise.

22. The computer program product of claim 13, wherein the test script has an associated parameter interface defining input parameters available for use in the test script, the method further comprising instructions to:
access parameter values according to the parameter interface to obtain the set of input parameter values for the function call in the test script.

23. The computer program product of claim 13, wherein the test script has an associated parameter interface defining input parameters available for use in the test script, the computer program product further comprising instructions to:
access parameter values according to the parameter interface to obtain the set of input parameter values for the function call in the test script.

24. The computer program product of claim 13, wherein the test script has an associated parameter interface defining input parameters available for use in the test script, the computer program product further comprising instructions to:
use the parameter interface to obtain import and export parameters for the test script.

* * * * *